Oct. 30, 1951   F. J. STOVER   2,573,623
VALVE HEAD
Filed Dec. 7, 1945
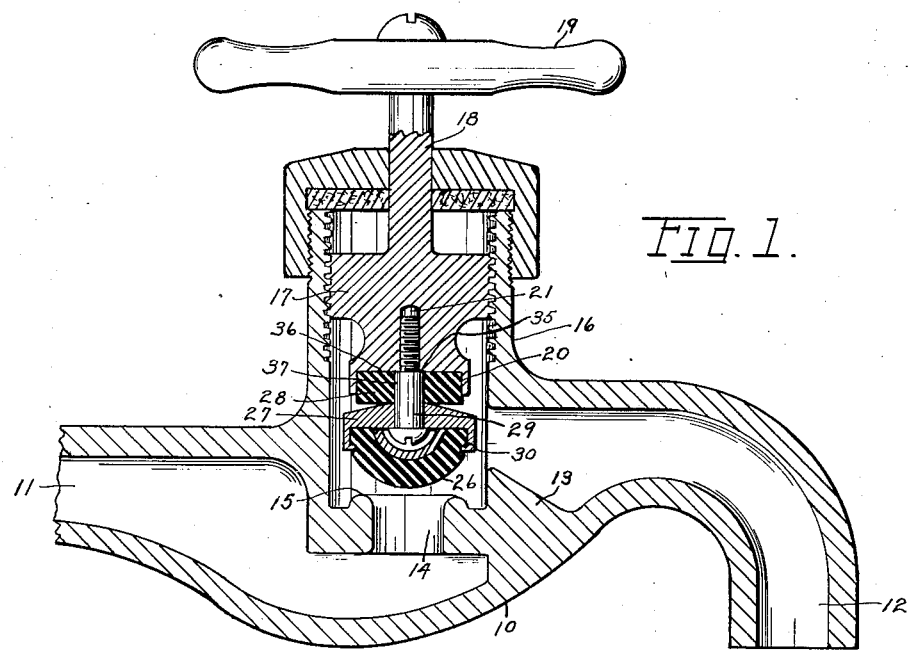
Fig. 1.
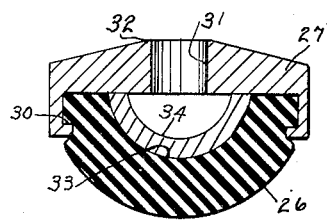
Fig. 2.
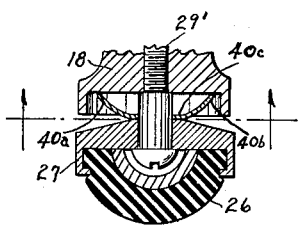
Fig. 4.
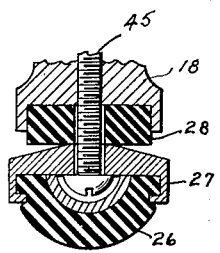
Fig. 6.
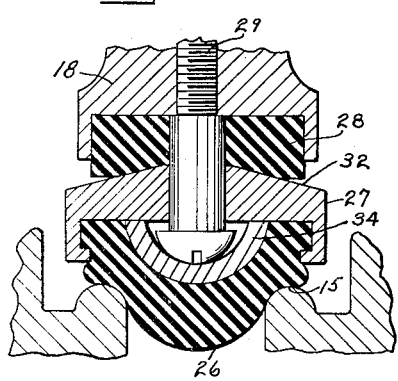
Fig. 3.
Fig. 5.
INVENTOR
FRED J. STOVER
By Hyde and Meyer
ATTORNEYS Patented Oct. 30, 1951

2,573,623

UNITED STATES PATENT OFFICE 2,573,623

VALVE HEAD

Fred J. Stover, Rocky River, Ohio

Application December 7, 1945, Serial No. 633,347

3 Claims. (Cl. 251—46)

1

The invention relates to a compression valve head for fluid transmitting means, and will be described with specific reference to its use in a domestic water faucet.

An object of the invention is to provide a resilient sealing washer for a valve head of the compression type, in combination with resiliently yieldable backing means for the washer retaining means.

A further object of the invention is to provide, in the combination just mentioned, a sealing washer retaining means which is freely rotatable, and compressible against resilient bias, while removably carried by the valve stem.

A further object of the invention is to provide, for a compression valve head a combination of a sealing washer and resilient backing means, said combination being adapted to be installed in standard plumbing fixtures now in general use.

A further object of the invention is to provide a compression valve for a liquid dispensing and transmitting system, said valve comprising a valve stem axially movable towards and from a valve seat, a valve head carried by said stem and including a resilient sealing washer freely rotatable and axially movable with respect to said stem, and resilient backing means interposed between said sealing washer and said stem whereby, when said valve head is advanced to initial contact with said valve seat, further advance movement of said stem induces compression of said backing means without rotary movement of said sealing washer on said seat.

Other objects and advantages will be apparent from a study of the following specification, in conjunction with the accompanying drawings, in which:

Fig. 1 is a vertical sectional view through a domestic water faucet, showing my novel valve head, valve seat and valve operating mechanism, the valve being shown in open position.

Fig. 2 is a detail view, somewhat enlarged, showing the sealing washer and its supporting disk.

Fig. 3 is a fragmentary sectional view, similar to the corresponding part of Fig. 1, but showing the valve head in closed position.

Fig. 4 is a fragmentary sectional view showing a somewhat modified resilient backing means for the valve head.

Fig. 5 is a horizontal sectional view taken on the line 5—5 of Fig. 4.

Fig. 6 is a fragmentary sectional view showing my novel valve head as used in conjunction with a conventional retaining screw.

2

It is well known to the ordinary householder that one of the reasons for rapid wear of the sealing washer in water faucets is the fact that the means for securing the conventional washer prevents movement of the washer with relation to its support, and as a consequence the rotary advance movement of the valve head to a compressed, fully sealed position, and withdrawal therefrom, in frequently repeated cycles of use, produces frictional wear of the washer so as to reduce its efficiency and to require frequent replacement.

I have provided a valve head device which not only permits the sealing washer to come to a stop on the valve seat, regardless of rotary and linear movement of the valve stem, but also provides an additional resilient backing means for the sealing washer so as to augment the sealing action during advance of the valve stem. My invention will now be more particularly described, with reference first to Figs. 1, 2 and 3.

In the drawings there is shown a conventional faucet body 10, as customarily used for a water outlet. It will be understood, however, that my improved valve head is readily applicable to the control of liquid flow in many appliances other than the one specifically shown. The faucet is provided with the usual inlet portion 11 and discharge nozzle 12. Disposed within the faucet between said inlet portion and discharge nozzle is the customary cross partition 13 having therein an aperture 14 surrounded by an up-turned bead 15 which provides an annular valve seat. Directly above said valve seat the faucet is provided with an upwardly opening extension portion 16 which is internally threaded to receive an externally threaded collar 17 which is integral with the valve stem 18. The lower end of valve stem 18 is bored out to provide a circular recess 20 at the center of which is the usual threaded aperture 21.

The construction so far described is conventional, and it will be apparent that rotation of valve stem 18 by a handle 19 produces endwise linear movement of the valve stem 18 so as to advance the valve head axially into operative contact with its seat, or withdraw it therefrom.

My invention resides in a valve head comprising the combination of a sealing washer 26, a washer retaining means 27, which is normally freely rotatable when the valve is unseated, and resilient backing means 28, all of which are affixed to the valve stem by attaching means such as a machine screw 29 which has a threaded engagement in the usual threaded aperture 21.

Sealing washer 26 (Fig. 2) is of hemispherical shape convex downwardly and is seated in an undercut socket 30 in the disk 27 which here constitutes the sealing washer retaining means. Disk 27 is centrally perforated at 31, the perforation being slightly oversize with respect to the shank of screw 29, so that the disk is freely rotatable on the screw shank. The upper surface 32 of disk 27 lies adjacent to, and in contact with, backing washer 28 when the valve is in the open position shown in Fig. 1. Said upper surface 32 is conical or upwardly convergent for a purpose soon to become apparent.

Sealing washer 26 is actually cup shaped, having a depression 33 in its base which receives a cup shaped liner 34 of brass or the like and only slightly larger than the head of the screw 29.

In assembling and installing my improved valve head the valve stem is removed from the faucet, and the resilient backing means is placed in recess 20. This backing means, washer 28, may be a flat faucet washer of known type of rubberlike material. The shank of screw 29 is inserted upwardly through aperture 31 in disk 27, and through the aperture in resilient backing washer 28, after which the screw is threaded into aperture 21 and rotated until the shoulder 35 of the screw seats against the base 36 of the recess. The unthreaded shoulder portion 37 of the screw, in preferred form, is of such length that when the device is assembled as just described the disk 27 is freely rotatable on said unthreaded shank portion. The liner 34 is fixed in the concavity of the sealing washer 26 by any suitable sealing or vulcanizing method, and the base edge of the washer 26 is then snapped into the undercut recess of disk 27. The stem is then ready to be reinserted in the faucet.

The device operates as follows, reference being had to Figs. 1 and 3. Starting from the position shown in Fig. 1, the handle 19 is rotated to produce downward movement of valve stem 18 which carries thereon an assembled valve head as already described. When contact is established between the sealing washer 26 and the valve seat 15, washer 26 and its carrying means 27 cease to rotate, despite further rotation of the stem 18 and they retain the position thus established during the period while the valve remains closed. Further rotary motion of valve stem 18 in the same direction forces the head of screw 29 against the liner 34 so as to force the central portion of washer 26 well below the seat 15. This causes the washer to snugly embrace seat 15 both inside and on the top as clearly seen in Fig. 3. This causes the conical surface 32 of disk 27 to be forced into the resilient backing washer 28. This conical surface centers the pressure of stem 18 on washer 26. As downward movement of the valve stem progresses the area of engagement between surface 32 and washer 28 increases as shown in Fig. 3 and consequently there is a corresponding increase in the resilient backing pressure effective on sealing washer 26, of course without rotation or abrasion of sealing washer 26.

It will be accordingly apparent that I have provided a novel and improved valve construction which permits a heavy sealing pressure without frictional abrasion of the sealing washer.

Figs. 4 and 5 illustrate another embodiment of my invention in which the resilient backing means consists of a leaf spring 40 having two opposed spring fingers 40a and 40b and a somewhat enlarged center portion 40c which is perforated to permit passage therethrough of screw 29'. This dispenses with the necessity of backing washer 28 (Fig. 1) and permits the fabrication of spring 40 from metal stock of any desired dimensions and spring characteristics to suit the particular demand. The operation of the embodiment shown in Figs. 4 and 5 will be apparent from a consideration of the description of the operation of the previously described embodiment. It is just the same except that spring 40 is compressed like washer 28 in Fig. 3 when the valve is closed.

One of the particular advantages of my invention is the fact that the valve herein disclosed can be adapted to any standard compression valve stem now in general use, with few or no changes in constructional detail. As already mentioned, the valve stem 18 and valve seat 15 shown in the drawings are conventional, including the recess 20 and the screw aperture 21. The householder may remove the screw from his ordinary water faucet gasket and use the same screw or a longer one for attaching my improved valve head, including the sealing washer, and the retaining disk. This construction, using the conventional screw 45, is shown in Fig. 6, the screw being threaded over the full shank distance. The screw must be of suitable length to enter the aperture 21 over a substantial portion of its length but provide some working clearance between disk 27 and washer 28. With the exception of the screw 45, the elements shown in Fig. 6 are identical with those shown in Fig. 1 and operate in the same way to close and open the faucet.

What I claim is:

1. A valve head for a compression valve of the type including a valve seat, a valve stem axially movable toward and from said seat by rotation of said stem, and a valve head affixed to said stem, said valve head comprising sealing means adapted to contact said seat, and resiliently yieldable backing means interposed between said sealing means and said stem, said sealing means consisting of a cup shaped washer convex towards said seat and washer supporting means consisting of a disk member secured to the base of said washer, said backing means and said disk member having centrally disposed aligned apertures to receive the shank of an attaching screw passing therethrough and seatable in the end of said valve stem, the aperture in said disk being oversize with respect to said shank to permit rotation of said washer and its supporting disk on said screw shank, the surface of said disk adjacent said resilient backing means being of frusto-conical contour, converging towards said backing means whereby pressure between said washer and said backing means, imbeds said frusto-conical surface in said backing means.

2. The combination of claim 1 wherein a substantially rigid cup shaped liner is provided inside of said cup shaped washer and nesting therewith, said cup shaped liner being axially aligned with the head of said attaching screw, and the clearance between said liner and said screw head being such that the relative movement between said disk and said backing means, when imbedding said frusto-conical surface of said disk in said backing means, causes the head of said screw to engage said liner.

3. A valve head for a compression valve of the type including a valve seat, a valve stem axially movable toward and from said seat by rotation of said stem, and a valve head affixed to said stem, said valve head comprising sealing means adapted to contact said seat, and resiliently yieldable backing means interposed between said sealing means and said stem, said sealing means consisting of a cup shaped washer convex towards said seat and washer supporting means consisting of a disk member secured to the base of said washer, said backing means and said disk member having centrally disposed aligned apertures to receive the shank of an attaching screw passing therethrough and seatable in the end of said valve stem, the aperture in said disk being oversize with respect to said shank to permit rotation of said washer and its supporting disk on said screw shank, there normally being a clearance between said screw head and the convex interior of said washer when said backing means is unstressed, and said clearance being such that relative movement between said disk and said backing means causes said head to engage said washer when said stem is manipulated to press said washer against said seat with sufficient pressure to stress said backing means.

FRED J. STOVER.

REFERENCES CITED

The following references are of record in the file of this patent:

UNITED STATES PATENTS

| Number | Name | Date |
|---|---|---|
| 122,494 | Russell | Jan. 2, 1872 |
| 485,055 | Quinn | Oct. 25, 1892 |
| 600,360 | Crane | Mar. 8, 1898 |
| 905,181 | Hedges | Dec. 1, 1908 |
| 1,529,926 | Scheelk | Mar. 17, 1925 |
| 1,540,839 | Heydrich | June 9, 1925 |
| 2,077,766 | Mead | Apr. 20, 1937 |
| 2,132,894 | Esnard | Oct. 11, 1938 |
| 2,204,355 | Hare | June 11, 1940 |
| 2,271,391 | Drake | Jan. 27, 1942 |
| 2,311,110 | Johnson | Feb. 16, 1943 |